(12) United States Patent
Hoge et al.

(10) Patent No.: US 7,168,648 B2
(45) Date of Patent: Jan. 30, 2007

(54) PERFORMANCE TAPE CARTRIDGE LEADER FOR SINGLE REEL TAPE CARTRIDGES

(75) Inventors: David Thomas Hoge, Westminster, CO (US); William J. Vanderheyden, Loveland, CO (US); Michael Burke, Lafayette, CO (US)

(73) Assignee: Quantum Corporation, San Jose, CA (US)

( * ) Notice: Subject to any disclaimer, the term of this patent is extended or adjusted under 35 U.S.C. 154(b) by 377 days.

(21) Appl. No.: 10/490,807

(22) PCT Filed: Oct. 5, 2001

(86) PCT No.: PCT/US01/31635

§ 371 (c)(1),
(2), (4) Date: Jul. 6, 2004

(87) PCT Pub. No.: WO03/032317

PCT Pub. Date: Apr. 17, 2003

(65) Prior Publication Data

US 2004/0238673 A1      Dec. 2, 2004

(51) Int. Cl.
*G11B 15/66* (2006.01)

(52) U.S. Cl. .......................... 242/332.4; 242/332.7; 360/132

(58) Field of Classification Search ............. 242/332.4, 242/332.7, 531.1, 582; 360/132
See application file for complete search history.

(56) References Cited

U.S. PATENT DOCUMENTS

| | | | |
|---|---|---|---|
| 3,150,840 A | 9/1964 | Briskin | |
| 3,227,387 A | 1/1966 | Laa et al. | |
| 3,254,856 A | 6/1966 | Camras | |
| 3,379,387 A | 4/1968 | Takahashi et al. | |
| 3,620,893 A | 11/1971 | Tarrson | |
| 3,655,145 A | 4/1972 | Olsen | |
| 3,690,582 A | 9/1972 | Duvall | |
| 3,706,423 A | 12/1972 | Neff | |
| 3,764,088 A | 10/1973 | Yamada et al. | |
| 3,809,218 A | 5/1974 | Furst | |
| 4,090,680 A | 5/1978 | Karsh | |
| 4,572,460 A | 2/1986 | Hertrich | |
| 4,662,049 A | 5/1987 | Hertrich | |
| 4,720,913 A | 1/1988 | Hertrich | |
| 5,740,983 A | 4/1998 | Earle et al. | |

(Continued)

FOREIGN PATENT DOCUMENTS

| | | |
|---|---|---|
| DE | 10045032 | 5/2001 |
| EP | 0143598 A2 | 6/1985 |
| EP | 0932155 A2 | 7/1999 |
| EP | 1008990 | 6/2000 |

(Continued)

*Primary Examiner*—John Q. Nguyen
(74) *Attorney, Agent, or Firm*—Morrison & Foerster LLP

(57) ABSTRACT

The tape cartridge leader includes a smoothing feature that comprises a blind cut out formed in a surface of the tape cartridge leader that faces the hub of the take-up reel when the tape cartridge leader is wound on the hub to compensate for the irregularity generated by the buckling mechanism. The blind cut out consists of a shallow, smooth depression that is positioned to overlay the buckling mechanism. The geometry and size of the blind cut out can be selected from a wide variety of options, with all of these variations having the advantage of providing increased tensile strength for the tape cartridge leader over tape cartridge leaders that use smoothing apertures, since there is no hole formed in the tape cartridge leader.

8 Claims, 3 Drawing Sheets

U.S. PATENT DOCUMENTS

| | | |
|---|---|---|
| 5,769,346 A | 6/1998 | Daly |
| 5,971,310 A | 10/1999 | Saliba et al. |
| 6,034,850 A | 3/2000 | Del Genio et al. |
| 6,050,514 A | 4/2000 | Mansbridge |
| 6,092,754 A | 7/2000 | Rathweg et al. |
| 6,095,445 A | 8/2000 | Hentrich |
| 6,186,430 B1 | 2/2001 | Zweighaft |
| 6,311,915 B1 | 11/2001 | Rathweg |
| 6,439,489 B1 | 8/2002 | Hoge |
| 6,550,710 B2 | 4/2003 | Hoge et al. |
| 6,568,617 B1 * | 5/2003 | Rambosek ............... 242/332.4 |

FOREIGN PATENT DOCUMENTS

| | | |
|---|---|---|
| EP | 1083566 | 3/2001 |
| JP | 11167785 | 6/1999 |
| WO | WO 86/07471 A1 | 12/1986 |

* cited by examiner

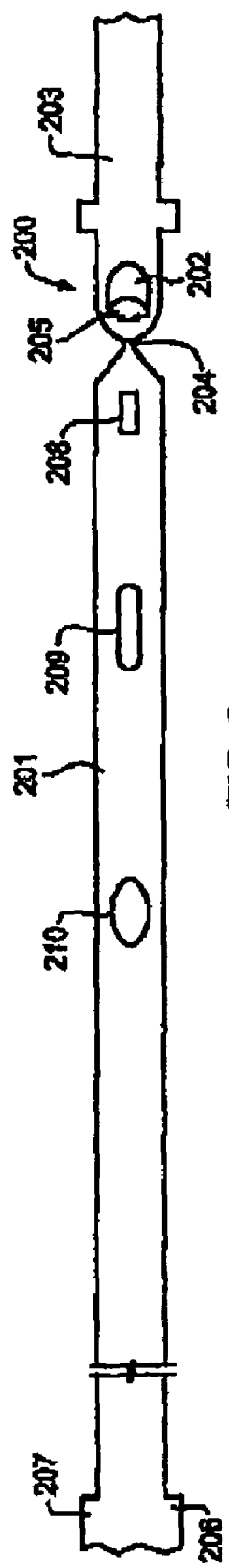
FIG. 2
PRIOR ART
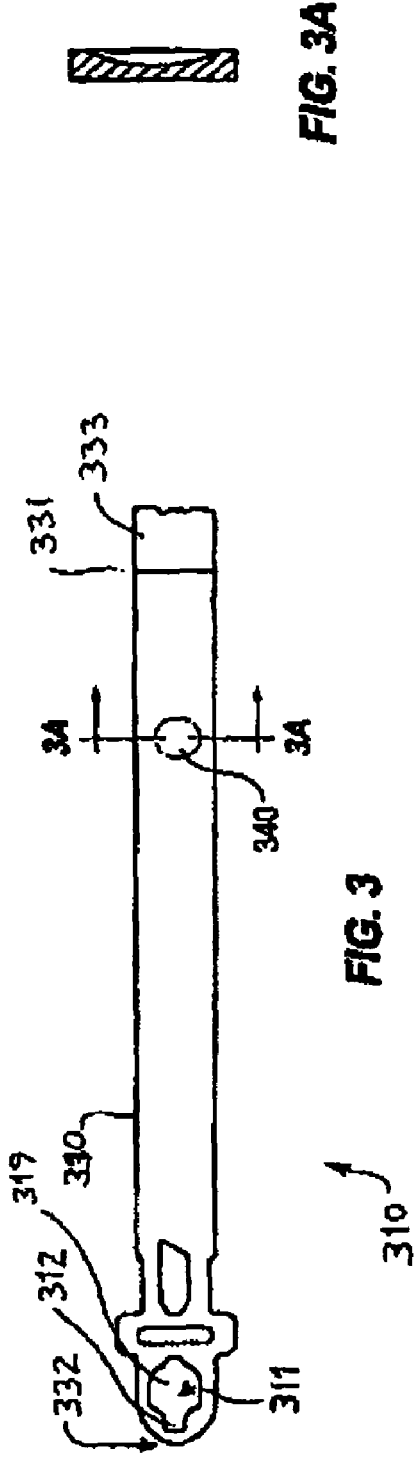
FIG. 3A
FIG. 3

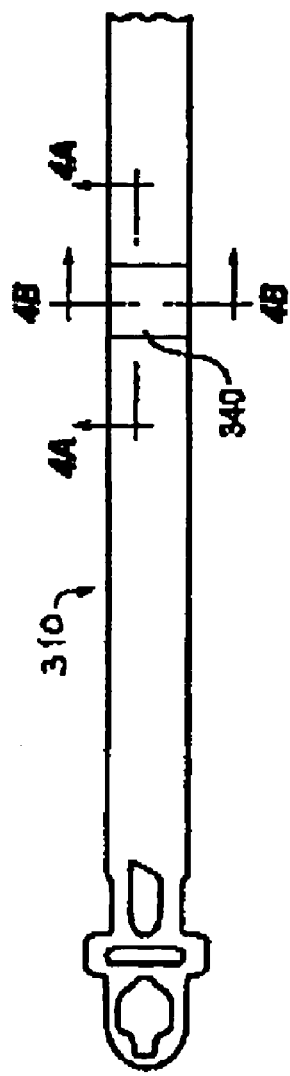
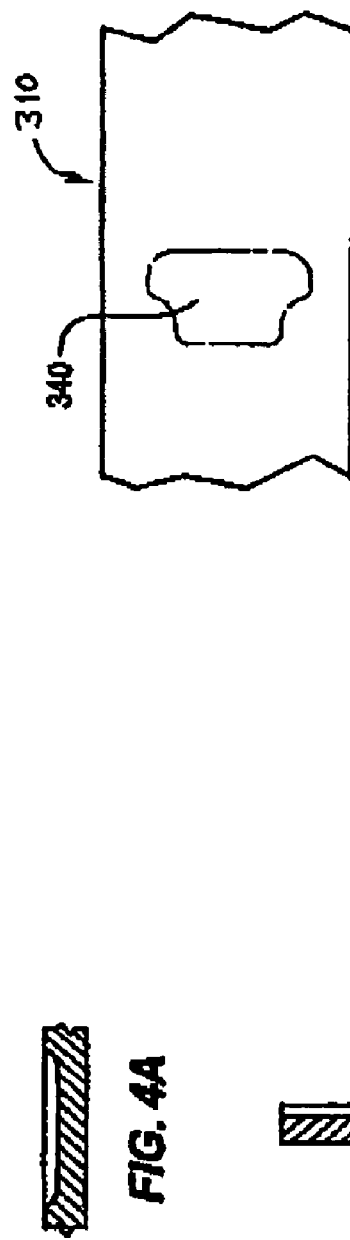

PERFORMANCE TAPE CARTRIDGE LEADER FOR SINGLE REEL TAPE CARTRIDGES

CROSS-REFERENCE TO RELATED APPLICATIONS

This application is related to an application titled "Tape Cartridge Leader For Single Reel Tape Cartridges For Improved Performance", U.S. Ser. No. 09/910,089, filed on Jul. 20, 2001 and "Improved Performance Tape Cartridge Leader For Single Reel Tape Cartridges", filed in the PCT on Sep. 24, 2001.

FIELD OF THE INVENTION

The invention relates to digital tape cartridges, and in particular, to a tape cartridge leader having improved performance characteristics for use in single reel tape cartridges.

Problem

It is a problem in single reel magnetic tape cartridges to prevent the tape cartridge leader from being wound on to the tape reel hub in a manner that causes an irregularity in the resultant tape leader surface on which the magnetic tape is subsequently wound. In particular, the single reel tape cartridge uses a tape buckling mechanism that consists of a tab that is inserted into a leader buckling hole formed in the tape drive take-up leader. As this buckling apparatus is wound on to the take up reel, the tab and leader buckling hole combination cause an irregularity in that the tab overlays the edges of the leader buckling hole to build up a double thickness section of leader in the leader wrap on the take-up reel. This irregularity causes a problem known as tape impressions which are marks that are left on the magnetic tape portion of the media as a result of the magnetic tape being wound tightly on top of the irregularity. The tape impressions cause data loss and/or data corruption.

U.S. Pat. No. 3,706,423 discloses a leader architecture that addresses this problem by providing two smoothing apertures, one located on each of two mating leaders to compensate for the irregularity caused by the buckling mechanism. The smoothing apertures consist of round or oval holes that are formed in the leader. As that tape leader is wound on the take-up reel, the two smoothing apertures are positioned on the two leaders to underlay and overlay, respectively, the buckling mechanism. While these two smoothing apertures substantially compensate for the tape buckling irregularity, there are reliability problems with the present design of the tape cartridge leader due to the weakness in the leader that is caused by the two smoothing apertures. In addition, the newer tape cartridges use thinner tape which results in more wraps of magnetic tape on the take-up reel and higher tape wrap pressures. The thinner magnetic tape is therefore more susceptible to tape impressions, and any sharp edge in the buckling mechanism or smoothing apertures can cause tape impressions. For example, the smoothing apertures are oversized to account for tape wrap misalignment and the resultant gaps around the buckle area may cave in from the increased tape wrap pressure, thereby offsetting the smoothing effect of the smoothing apertures. In addition, the smoothing apertures have sharp edges that can have burrs or rough edges left over from the manufacturing process. All of these elements can reduce the effectiveness of the smoothing apertures.

Solution

The present invention overcomes the problems outlined above and advances the art by providing a tape cartridge leader for a single reel tape cartridge that has improved performance and reliability. The present tape cartridge leader comprises an elongated main body integrally formed between a first end and a second end. The first end connects to the magnetic tape media that is wound on the supply reel in the single reel tape cartridge. The second end includes an ovular aperture that buckles with the stem and tab of the take-up leader of the tape drive. The tape cartridge leader includes a smoothing feature that comprises a blind cut out formed in a surface of the tape cartridge leader that faces the hub of the take-up reel when the tape cartridge leader is wound on the hub to compensate for the irregularity generated by the buckling mechanism. The blind cut out consists of a shallow, smooth depression that is positioned to overlay the buckling mechanism. The geometry and size of the blind cut out can be selected from a wide variety of options, with all of these variations having the advantage of providing increased tensile strength for the tape cartridge leader over tape cartridge leaders that use smoothing apertures, since there is no hole formed in the tape cartridge leader. The blind cut out can be round, oval, rectangular, or shaped to match the geometry of the buckling mechanism and can occupy a portion of the width of the tape cartridge leader or can extend across the entire width of the tape cartridge leader. Since the blind cut out is formed as a smooth depression, no undesirable burrs or rough edges are present to cause tape impressions.

In addition, the blind cut out can be implemented in an analogous manner in the take-up leader in the tape drive. Thus, the concept of the blind cut out is equally applicable to the tape cartridge leader and the take-up leader.

BRIEF DESCRIPTION OF THE DRAWINGS

FIG. 2 illustrates an example of a prior art tape cartridge leader connected to a take-up leader;

FIGS. 3, 3A illustrate a tape cartridge leader according to the present invention connected to a take-up leader and further cross-section details of this embodiment, respectively;

FIGS. 4, 4A & 4B illustrate an alternate embodiment of the tape cartridge leader according to the present invention connected to a take-up leader and further cross-section details of this embodiment, respectively; and FIG. 5 illustrates another alternative embodiment of the tape cartridge leader according to the present invention.

DETAILED DESCRIPTION

Figure 1:
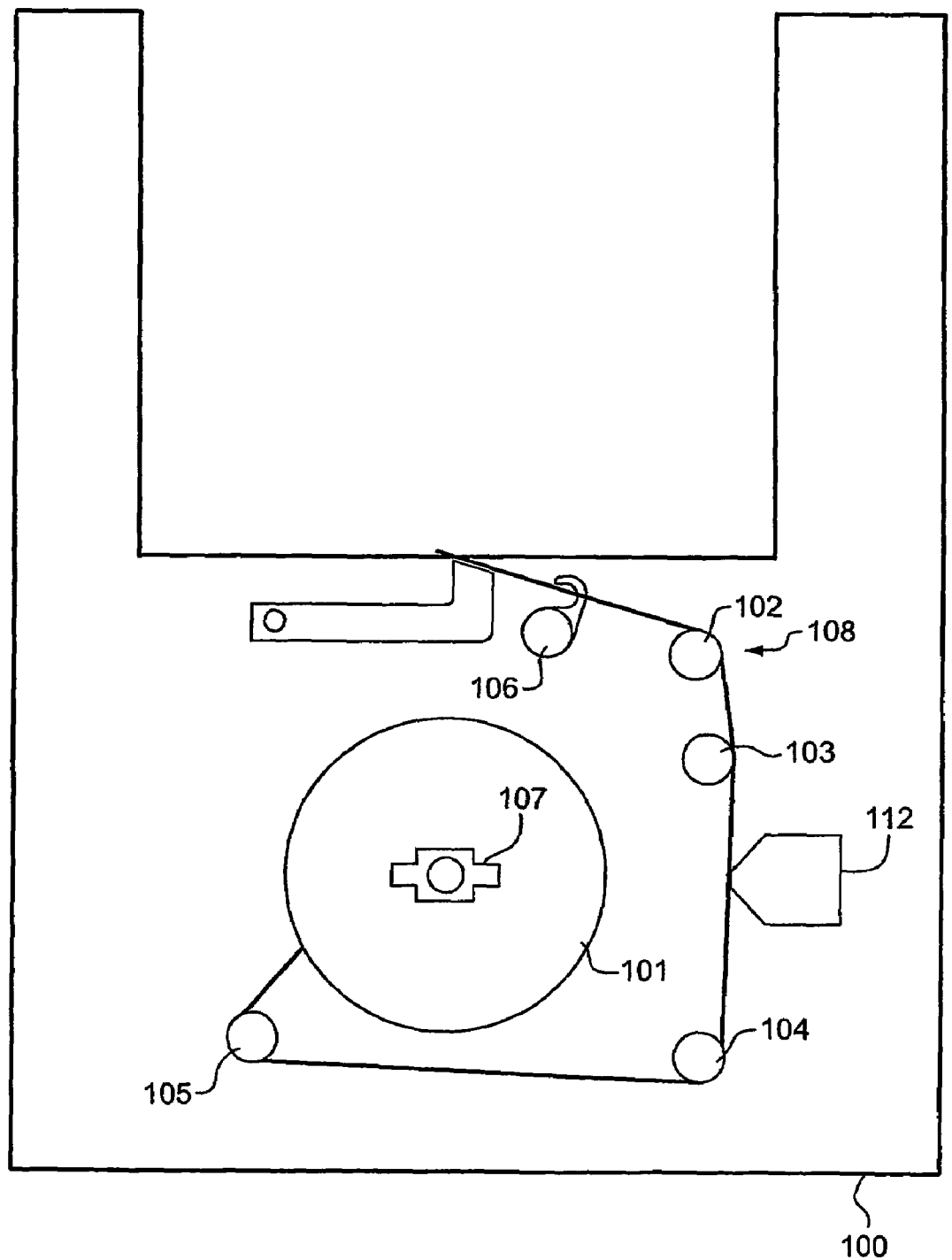
FIG. 1 illustrates an example of a single reel tape cartridge that could incorporate a tape cartridge leader according to the present invention.

Digital data is stored by tape drives on to magnetic tape media utilizing a variety of tape cartridge and tape cassette designs, but in all cases, the magnetic tape media is wound between a pair of tape reels as data is transferred to or from the magnetic tape media. In the art of data storage, the physical space required to store data is an important concern. Referring to FIGS. 1–2, to conserve space, tape drives often use the single reel tape cartridge design shown in FIG. 1, which utilizes a supply reel located within a removable tape cartridge (not shown) and a take-up reel 101 located within the tape drive 100.

After the tape cartridge is inserted into the tape drive 100, the magnetic tape media must be loaded into the tape drive 100. The loading operation includes connecting the magnetic tape media to the take-up reel 101 and winding the magnetic tape media to a start point or read position adjacent a tape head 112. Various methods have been employed to make this connection. FIG. 2 illustrates one such method wherein the magnetic tape media connects to the take-up reel 101 via a buckle 200 between a tape cartridge leader 203 and a take-up leader 201. The tape cartridge leader 203 terminates the magnetic tape media at one end and consists of a strong flexible plastic strip that includes an ovular aperture 202 configured to mate with the take-up leader 201. The take-up leader 201 is a similar strong flexible plastic strip that attaches at one end to the take-up reel 101 using a pair of integrally formed flanges 206 and 207. The opposing end includes a stem 204 and a tab 205 designed to buckle with the ovular aperture 202 on the tape cartridge leader 203.

The take-up leader 201 also includes apertures 209, 210 and 208. When a tape cartridge is not present in the tape drive 100, the take-up leader 201 is wound around a plurality of guide rollers 102–105 in a curvilinear tape path and is secured in place by a rotating catch 106 that extends through the aperture 208. During operation of the tape drive 100, the catch 106 is rotated to an out of the way position to enable the tape drive to wind the magnetic tape media between the take-up reel 101 and the supply reel in the tape cartridge. In addition, the aperture 209 is used by the tape drive 100 to detect when the take-up leader 201 and the tape cartridge leader 203 are in an unbuckled position for ejection of the tape cartridge from the tape drive. The aperture 210 is configured so that the buckle 200, between the take-up leader 201 and the tape cartridge leader 203, aligns with the aperture 210 to reduce the effect of the added height of the buckle 200 during winding around the take-up reel 101.

In similar fashion, the tape cartridge leader 203 consists of a strong flexible plastic strip that includes an ovular aperture 202 that buckles with the stem 204 and tab 205 of the take-up leader 201 of the tape drive. To prevent the tape cartridge leader 203 from being wound entirely into the tape cartridge, beyond the reach of the take-up leader 201 in the tape drive, the tape cartridge is equipped with a rotating cartridge leader retention hook 214 which is fixed to the cartridge housing and that extends through rectangular-shaped aperture 212. In addition, a pair of guide "wings", each consisting of a rectangular-shaped extension in the width direction of the tape cartridge leader 203, follow corresponding guide tracks formed in the opposing supply reel flanges to guide the tape cartridge leader 203 into position, centered between the supply reel flanges. The guide wings are also used as a tape leader retention feature, since they engage stops formed in the guide tracks, to thereby limit the movement of the tape cartridge leader 203 into the tape cartridge.

FIGS. 3, 3A illustrate a tape cartridge leader according to the present invention connected to a take-up leader and further cross-section details of this embodiment, respectively. FIGS. 4, 4A & 4B illustrate an alternate embodiment of the tape cartridge leader according to the present invention connected to a take-up leader and further cross-section details of this embodiment, respectively. FIG. 5 illustrates another alternative embodiment of the tape cartridge leader according to the present invention. It is anticipated however, that one skilled in the art will recognize numerous other examples in accordance with the principles described below, and thus, the following examples are for the purpose of illustration and not limitation. Those skilled in the art will also appreciate that various described features could be combined to form multiple variations of the invention.

Advantageously, the present tape cartridge leader 310 is similar in design and function to the conventional tape cartridge leader 203 and is configured for use in a conventional tape drive e.g. 100. The tape cartridge leader 310 comprises an elongated main body 330 integrally formed between a first end 331 and a second end 332. The first end 331 connects to the magnetic tape media 333 that is wound on the supply reel in the tape cartridge. The second end 332 includes an ovular aperture 311 that buckles with the stem and tab 301 of the take-up leader 300 of the tape drive.

The cartridge leader buckling hole 311 comprises two parts: a buckling tip receiving aperture 319 and a mushroom tip receiversegment 312. The buckling tip receiver aperture 319 comprises a target opening through which the mushroom tip 301 of the take-up leader 201 is inserted, The take-up leader 201 is then engaged with the tape cartridge leader 310 by inserting the neck of the mushroom tip 205 into the mushroom tip receiver segment 312, so that the mushroom tip 205 of the take-up leader 201 cannot be pulled loose from the tape cartridge leader 310.

The tape cartridge leader 310 includes a blind cut out 340 that is formed in a surface of the tape cartridge leader 310 that faces said hub of the take-up reel when the tape cartridge leader 310 is wound on the hub to compensate for the irregularity generated by the buckling mechanism. The blind cut out 340 consists of a shallow, smooth depression that is positioned to overlay the buckling mechanism when the tape cartridge leader 310 is wound on the hub. The geometry and size of the blind cut out 340 can be selected from a wide variety of options, with all of these variations having the advantage of providing increased tensile strength for the tape cartridge leader 310 over tape cartridge leaders that use smoothing apertures, since there is no hole formed in the tape cartridge leader 310. The blind cut out as shown in FIG. 3 can be round (or oval), rectangular (FIG. 4), or shaped (FIG. 5) to match the geometry of the buckling mechanism and can occupy a portion of the width of the tape cartridge leader (FIGS. 3, 5) or can extend across the entire width (FIG. 4) of the tape cartridge leader 310. Since the blind cut out is formed as a smooth depression (Cross-section FIGS. 3A, 4A, 4B), no undesirable burrs or rough edges are present to cause tape impressions.

Thus, the use of a blind cut out to compensate for the irregularity caused by the bucking mechanism solves the problem of tape impressions encountered in prior art single reel tape cartridges. In addition, while the blind cut out is illustrated as being implemented on the tape cartridge leader, this feature is equally applicable for use in the tape drive take-up leader. The take-up leader blind cut out is formed in a surface of the take-up leader that faces away from the hub of the take-up reel when the tape cartridge leader is wound on the hub, for underlying the buckling mechanism when the tape cartridge leader is wound on the take-up reel. Thus, in the tape drive/tape cartridge system, either or both the tape cartridge and the tape drive can use the blind cut out as a buckling mechanism compensation feature.

Those skilled in the art will appreciate that the above-described principles could be applied to other take-up leader designs to realize the advantages of the present invention. Those skilled in the art will also appreciate variations of the above-described embodiments that fall within the scope of the invention. As a result, the invention is not limited to the specific examples and illustrations discussed above, but only by the following claims and their equivalents.

What is claimed is:

1. A tape cartridge leader for terminating a magnetic tape media contained on a supply reel, having a hub and a pair of flanges, in a single reel tape cartridge that is loaded into a tape drive having a take-up reel comprising a hub and a pair of flanges, said tape cartridge leader being detachably connectable to a take-up leader located in a single reel tape drive and connected to said take-up reel so that said magnetic tape media can be wound through a curvilinear tape path internal to the tape drive, said tape cartridge leader comprising:
   an elongated main body integrally formed between a first end and a second end, wherein the first end is connected to said supply reel in said tape cartridge;
   buckling hole means, located within said second end, for detachably connecting to said take-up leader in the tape drive when the tape cartridge is loaded into the tape drive; and
   blind cut out means, located proximate to said second end, comprising a shallow depression formed in said tape cartridge leader in a surface of said tape cartridge leader that faces said hub of said take-up reel when said tape cartridge leader is wound on said hub, for overlaying said buckling hole means when said tape cartridge leader is wound on said take-up reel.

2. The tape cartridge leader of claim 1, wherein said blind cut out means comprises:
   a shallow depression formed in said tape cartridge leader that extends across the width of said tape cartridge leader.

3. The tape cartridge leader of claim 1, wherein said blind cut out means comprises:
   a shallow depression formed in said tape cartridge leader that is located within the width of said tape cartridge leader and is circular in shape.

4. The tape cartridge leader of claim 1, wherein said blind cut out means comprises:
   a shallow depression formed In said tape cartridge leader that is located within the width of said tape cartridge leader and is oval in shape.

5. The tape cartridge leader of claim 1, wherein said blind cut out means comprises:
   a shallow depression formed in said tape cartridge leader that is located within the width of said tape cartridge leader and is rectangular in shape.

6. The tape cartridge leader of claim 1, wherein said blind cut out means comprises:
   a shallow depression, having a continuous uninterrupted surface, formed in said tape cartridge leader.

7. The tape cartridge leader of claim 1, wherein said take-up leader comprises a stem and a tab integrally formed in an end of the take-up leader to engage said second end of said tape cartridge leader, said buckling hole means comprises:
   buckle hole means comprising an aperture formed in said tape cartridge leader for receiving said stem and tab integrally formed in an end of the take-up leader; and
   mushroom tip receiving means for engaging said tab, wherein said juncture of said buckle hole means and said mushroom tip receiving means has curved lead in corners to avoid catching said stem and tab.

8. The tape cartridge leader of claim 1, wherein said tape cartridge leader mates with a take-up leader located in a single reel tape drive that comprises:
   an elongated main body integrally formed between a first end and a second end, wherein the first end is connected to said take-up reel in said tape drive;
   buckling tab means, located at said second end, for detachably connecting to said tape cartridge when the tape cartridge is loaded into the tape drive; and
   blind cut out means, located proximate to said second end, comprising a shallow depression formed in said take-up leader in a surface of said take-up leader that faces away from said hub of said take-up reel when said tape cartridge leader is wound on said hub, for underlying said buckling tab means when said tape cartridge leader is wound on said take-up reel.

* * * * *